United States Patent
Ballard et al.

(10) Patent No.: US 11,411,753 B2
(45) Date of Patent: Aug. 9, 2022

(54) ADDING NETWORK CONTROLLER SIDEBAND INTERFACE (NC-SI) SIDEBAND AND MANAGEMENT TO A HIGH POWER CONSUMPTION DEVICE

(71) Applicant: DELL PRODUCTS, L.P., Round Rock, TX (US)

(72) Inventors: Lee E. Ballard, Georgetown, TX (US); Robert T. Stevens, Austin, TX (US); Jason B. Kilpatrick, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 397 days.

(21) Appl. No.: 16/458,076

(22) Filed: Jun. 30, 2019

(65) Prior Publication Data
US 2020/0412558 A1 Dec. 31, 2020

(51) Int. Cl.
| | |
|---|---|
| H04L 12/12 | (2006.01) |
| H04L 12/46 | (2006.01) |
| H04L 41/12 | (2022.01) |
| G06F 1/26 | (2006.01) |
| G06F 9/455 | (2018.01) |
| H04L 101/622 | (2022.01) |
| H04L 45/00 | (2022.01) |

(52) U.S. Cl.
CPC .............. *H04L 12/12* (2013.01); *G06F 1/266* (2013.01); *G06F 9/45558* (2013.01); *H04L 12/4633* (2013.01); *H04L 12/4641* (2013.01); *H04L 41/12* (2013.01); *H04L 45/70* (2013.01); *H04L 61/6022* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,645,567 B2 | 2/2014 | Shah et al. | |
| 2007/0115981 A1 | 5/2007 | Jreij et al. | |
| 2010/0005190 A1* | 1/2010 | Shah | H04L 41/0273 709/235 |
| 2016/0062433 A1* | 3/2016 | York | G06F 1/266 713/310 |
| 2018/0176036 A1* | 6/2018 | Butcher | H04L 69/22 |
| 2018/0210524 A1* | 7/2018 | Koenen | G06F 1/26 |
| 2019/0273700 A1* | 9/2019 | Itkin | H04L 49/254 |

* cited by examiner

*Primary Examiner* — Scott B Christensen
(74) *Attorney, Agent, or Firm* — Isidore PLLC

(57) ABSTRACT

A method includes determining, during auxiliary power operating mode of an information handling system, devices connected to peripheral component interconnect (PCI) slots and identifying, via a controller of the IHS, when a Virtual Ethernet Bridge (VEB) is present on a first communication path, which indicates that a high power consuming device with sideband enablement is present in a corresponding one of the PCI slots. The method includes configuring, via the first communication path, an uplink port on the VEB, collecting information about the VEB, including a VEB MAC address and capabilities of the VEB, setting a VLAN/MAC filter rule for NC-SI pass-through in the VEB, and configuring an intermediate device within a second communication path between the controller and the VEB for NC-SI pass-through utilizing a management MAC address, enabling NC-SI pass-through of traffic routed between the controller and the VEB.

20 Claims, 8 Drawing Sheets

ADDING NETWORK CONTROLLER SIDEBAND INTERFACE (NC-SI) SIDEBAND AND MANAGEMENT TO A HIGH POWER CONSUMPTION DEVICE

BACKGROUND

1. Technical Field

The present disclosure relates in general to peripheral component interconnect (PCI) connected, high power consuming devices with sideband enablement, and more particularly to an information handling system that provides management configuration of such devices during an auxiliary power operating mode via establishment of a second pass-through communication path.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are usually configured with a network interface controller (NIC) to enable the IHS to establish communication, via an external network, with other components and devices. More advanced systems, such as a server IHS, are configured with enhanced networking/communication components, such as fixed programmable gate arrays (FPGAs) and Smart NICs. These FPGAs and SmartNICs offer capabilities that are not found in traditional NIC ASICs (application specific integrated circuits). These capabilities can include vHost Data Path Acceleration (vDPA) and programmable pipelines to shape or route traffic in ways that are customized to a workload. SmartNICs and FPGAs are much higher power consuming devices and thus require more cooling than traditional NICs. As a result, these devices cannot support operation in the limited power and airflow environment of the auxiliary power supply (vAUX) operating mode of the IHS. Additionally, many of these components do not have and/or do not support out-of-band management.

BRIEF SUMMARY

Disclosed are a method, a baseboard management controller (BMC), and an information handling system (IHS) that enables management and configuration of a high-power consuming (HPwrC) peripheral component interconnect (PCI)-connected device and an associated Virtual Ethernet Bridge (VEB) via a controller of the IHS. According to one aspect, a method is provided for enabling network controller sideband interface (NC-SI) shared LAN on motherboard (LOM) and managing and configuring a system having a HPwrC PCI-connected device and an associated VEB within an information handling system (IHS). The method includes initiating, by a controller of the IHS during an auxiliary power (vAUX) operating mode, a discovery operation to identify which devices are connected to peripheral component interconnect (PCI) slots in the IHS. The method includes identifying, via a controller of the IHS, when the VEB is present on a first communication path linked to the PCI slots. The detected presence of the VEB indicates that the VEB is communicatively connected to the controller via the first communication path and that a HPwrC device with sideband enablement is present in a corresponding one of the PCI slots. The method includes, in response to identifying the VEB is communicatively connected to the controller via the first communication path: configuring, via the first communication path, an uplink port on the VEB; collecting information about the VEB, the information including a VEB MAC address and capabilities of the VEB; and setting a virtual local area network (VLAN)/medium access control (MAC) filter rule for NC-SI pass through to configure flows NC-SI pass-through in the VEB. The method further includes configuring an intermediate device within a second communication path between the controller and the VEB. The configuring includes configuring the intermediate device for NC-SI pass-through, including link parameters and a management MAC address.

According to another aspect, a controller of an IHS includes a memory having stored thereon a discovered VEB configuration module (VCM). The controller also includes a service processor communicatively coupled to the memory and that, while the IHS is in an auxiliary power (vAUX) operating mode, executes the VCM, which configures the controller to perform various detection, configuration, and management functions. The VCM configures the controller to initiate, during an auxiliary power (vAUX) operating mode, a discovery operation to identify which devices are connected to peripheral component interconnect (PCI) slots in the IHS, and to identify when the VEB is detected as being present on a first communication path linked to the PCI slots. The detection of the VEB indicates that the VEB is communicatively connected to the controller via the first communication path and that a HPwrC device with sideband enablement is present in one of the PCI slots. The VCM further configures the controller to, in response to identifying the VEB is communicatively connected to the controller via the first communication path: configure, via the first communication path, an uplink port on the VEB; collect information about the VEB, the information comprising a VEB MAC address and capabilities of the VEB; and set a virtual local area network (VLAN)/medium access control (MAC) filter rule to configure flows for NC-SI pass-through in the VEB. The VCM further configures the controller to configure an intermediate device within a second communication path between the controller and the VEB. The configuring includes configuring the intermediate device for NC-SI pass-through, including link parameters and a management MAC address.

According to yet another aspect of the disclosure, an information handling system (IHS) includes: a host system comprising a host processor; and a device communicatively coupled to the host system via a peripheral component interconnect (PCI) slot, the device being a high power consuming (HPwrC) device that operates only while the IHS is in a main power (on) operating mode. The IHS further includes a VEB communicatively coupled via at least one high bandwidth connector to the device and communicatively coupled to the PCI slot via a second-type connector supporting first-type communication. The IHS also includes a controller communicatively coupled to the VEB via a first communication path that includes at least one first-type connector. The controller is further communicatively coupled to the VEB via a second communication path having higher bandwidth connecting cables. The controller and the VEB operate while the IHS is in both an auxiliary power (vAUX) operating mode and the main power operating mode. The controller completes, while the IHS is in the vAUX mode: (i) discovery, management, and configuration of the VEB; and (ii) verification and configuration of a connectivity of the second communication path to provide pass through NC-SI management interfacing with and configuration of the VEB and/or the device and to enable selective routing and pass-through functionality for controller-provided and controller-received traffic over the second communication path through the VEB.

The above presents a general summary of several aspects of the disclosure to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
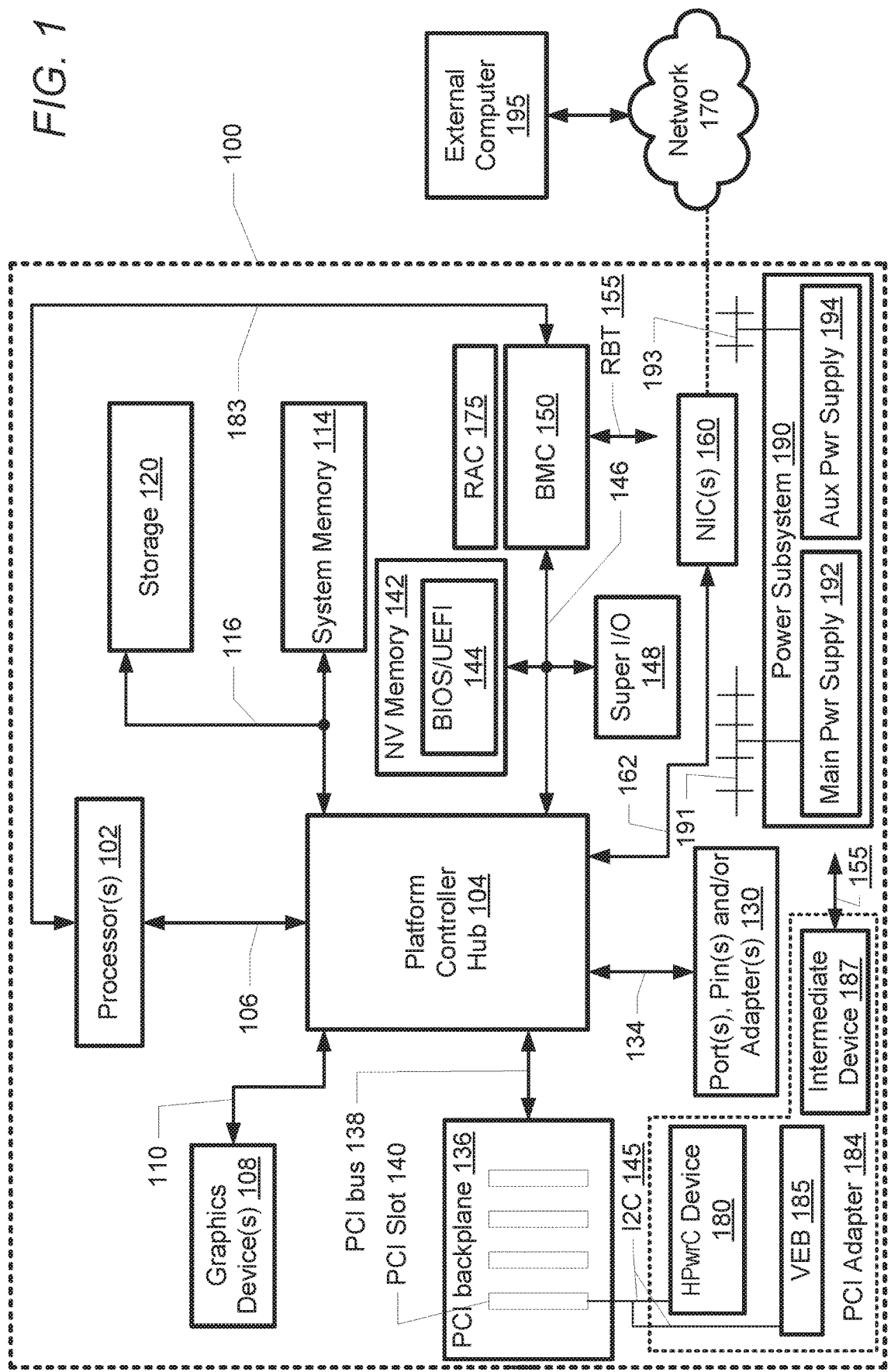
FIG. 1 is a high-level block diagram illustrating components of an information handling system (IHS) within which the various features described herein are implemented, in accordance with one or more embodiments.

Disclosed are an information handling system (IHS), a baseboard management controller (BMC), and a method that enables management and configuration of a Virtual Ethernet Bridge (VEB) communicatively linked to a high power consuming (HPwrC) component that is peripheral component interconnect (PCI)-connected in an IHS. According to one aspect, the method enables (i) network controller sideband interface (NC-SI) shared LAN on motherboard (LOM) and (ii) management of an IHS having a PCI-connected, HPwrC device and an associated VEB connected to a PCI slot. The method includes initiating, by a controller of the IHS during an auxiliary power (vAUX) operating mode, a discovery operation to identify which devices are connected to peripheral component interconnect (PCI) slots in the IHS. The method includes identifying, via a controller of the IHS, when the VEB is detected as being present on a first communication path linked to the PCI slots. The detected presence of the VEB indicates that the VEB is communicatively connected to the controller via the first communication path and that a HPwrC device with sideband enablement is present in a corresponding one of the PCI slots. The method includes, in response to identifying that the VEB is communicatively connected to the controller via the first communication path: configuring, via the first communication path, an uplink port on the VEB; and collecting information about the VEB, the information including a VEB MAC address and capabilities of the VEB. The method further includes setting a virtual local area network (VLAN)/medium access control (MAC) filter rule to configure flows for NC-SI pass-through in the VEB. The method further includes configuring an intermediate device within a second communication path between the controller and the VEB. The configuring includes configuring the intermediate device for NC-SI pass-through, including link parameters and a management MAC address.

The IHS includes the HPwrC device connected to a VEB via a high bandwidth direct communication path, with both the HPwrC device and the VEB connected via a low bandwidth path to the PCI slot. As an HPwrC device, the device requires the IHS to be in main power (on) mode to operate. The device is configured to receive management and configuration instructions via a network controller sideband interface (NC-SI) connection. The controller is communicatively coupled to both the VEB and to the device via a first communication path that traverses through the PCI slot, and the controller is further communicatively coupled to the VEB via a second communication path that includes an intermediate (management) device. While the IHS is in an auxiliary power supply (vAUX) operating mode, the controller performs system management interfacing with and configuration of the VEB, in part via routing controller-provided management instructions and configuration data over the second communication path through the intermediate device to the VEB. The VEB is configured to forward, based on the included destination MAC address, the outbound controller-provided traffic (including management instructions and configuration data) to either the network or to the HPwrC device over the high bandwidth, direct communication path.

In accordance with other aspects of the present disclosure, the IHS includes a host system comprising a host processor communicatively connected to the PCI backplane. The device is communicatively coupled to a PCI slot in the PCI backplane and requires the IHS to be in main/primary power (on) mode to operate. The IHS further includes a plurality of interconnected, low power consuming (LPC) components that enable system management interfacing with and configuration of the HPwrC device during a low/auxiliary power (vAUX) mode of the IHS. The plurality of interconnected LPC components include the VEB communicatively coupled via the high bandwidth, direct communication path to the HPwrC device, and the VEB communicatively coupled to the PCI slot via a signal trace (generally referred to herein as first-type connector) supporting low bandwidth data communication. The plurality of interconnected components also includes the controller, which, in the illustrative embodiment, is a baseboard management controller (BMC). The BMC is communicatively coupled to both the VEB and to the HPwrC device via the low bandwidth, first communication path, which is comprised of a plurality of the first-type connectors. The BMC is further communicatively coupled to the VEB via the second communication path.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 is a simplified functional block diagram illustrating an information handling system (IHS) 100 having specific configuration and interconnection of HPwrC devices and LPC components to enable a controller of the IHS to provide management for and configuration of an HPwrC device while the IHS is in the vAUX operating mode. Within the general context of IHSs, IHS 100 may include any instrumentality or an aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, IHS 100 may be a personal digital assistant (PDA), a consumer electronic device, a network storage device, or any other suitable device and may vary in size, shape, performance, functionality, and price. IHS may include random access memory (RAM), one or more processing resources such as a central processing unit (CPU) or hardware or software control logic, read only memory (ROM), and/or other types of nonvolatile memory. Additional components of IHS 100 may include one or more disk drives, one or more network ports for communicating with external devices as well as various input and output (I/O) devices, such as a keyboard, a mouse, and a video display. IHS 100 may also include one or more buses operable to transmit communications between the various hardware components.

In FIG. 1, the example configuration of IHS 100 includes processor(s) 102 coupled to platform controller hub (PCH) 104 via front-side bus 106. PCH 104 may be configured to coordinate I/O traffic between processor(s) 102 and other components. For example, in this particular implementation, PCH 104 is coupled to various other components such as graphics device(s) 108 (e.g., one or more video cards or adaptors, etc.) via graphics bus 110 (e.g., an Accelerated Graphics Port or AGP bus, a Peripheral Component Interconnect (PCI) bus, etc.). PCH 104 is also coupled to system memory 114 via memory bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 104 is coupled by memory bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 104 is also coupled to PCI backplane/subsystem 136 (e.g., modems, network cards, sound cards, video cards, shared memory etc.) via PCI bus 138. PCI subsystem 136 includes PCI slots 140 that enables insertion of one or more PCI-connected devices, such as high power consuming (HPwrC) device 180 and/or VEB 185 as described further herein. PCH 104 is further coupled to port(s), pin(s), and/or adapter(s) 130 over bus 134. Generally, PCH 104 may be configured to handle various I/O operations, and PCH 104 may provide interfaces such as, for instance, Universal Serial Bus (USB), audio, serial, parallel, Ethernet, and other interfaces, via port(s), pin(s), and/or adapter(s) 130 over bus 134. For example, PCH 104 may be configured to allow data to be exchanged between IHS 100 and other devices, such as other IHSs attached to a network. In various embodiments, PCH 104 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 104 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 104 is coupled to a non-volatile (NV) storage or memory device 142 via Low Pin Count (LPC) bus 146. NV memory 142 stores a basic input output system/Unified Extensible Firmware Interface (BIOS/UEFI) 144. BIOS/UEFI 144 includes program instructions typically as BIOS or UEFI images. Those instructions may be usable by processor(s) 102 to initialize and test other hardware components and/or to load an Operating System (OS) onto IHS 100. As such, BIOS/UEFI 144 may include a firmware interface that allows processor(s) 102 to load and execute certain firmware, as described in more detail below. In some cases, such firmware may include program code that is compatible with the UEFI specification, although other types of firmware may be used.

PCH 104 is also coupled to super I/O Controller 148 via LPC bus 146. Super I/O controller 148 combines interfaces for a variety of lower bandwidth or low data rate devices. Those devices may include, for example, floppy disks, parallel ports, a keyboard and mouse and other devices.

Figure 2:
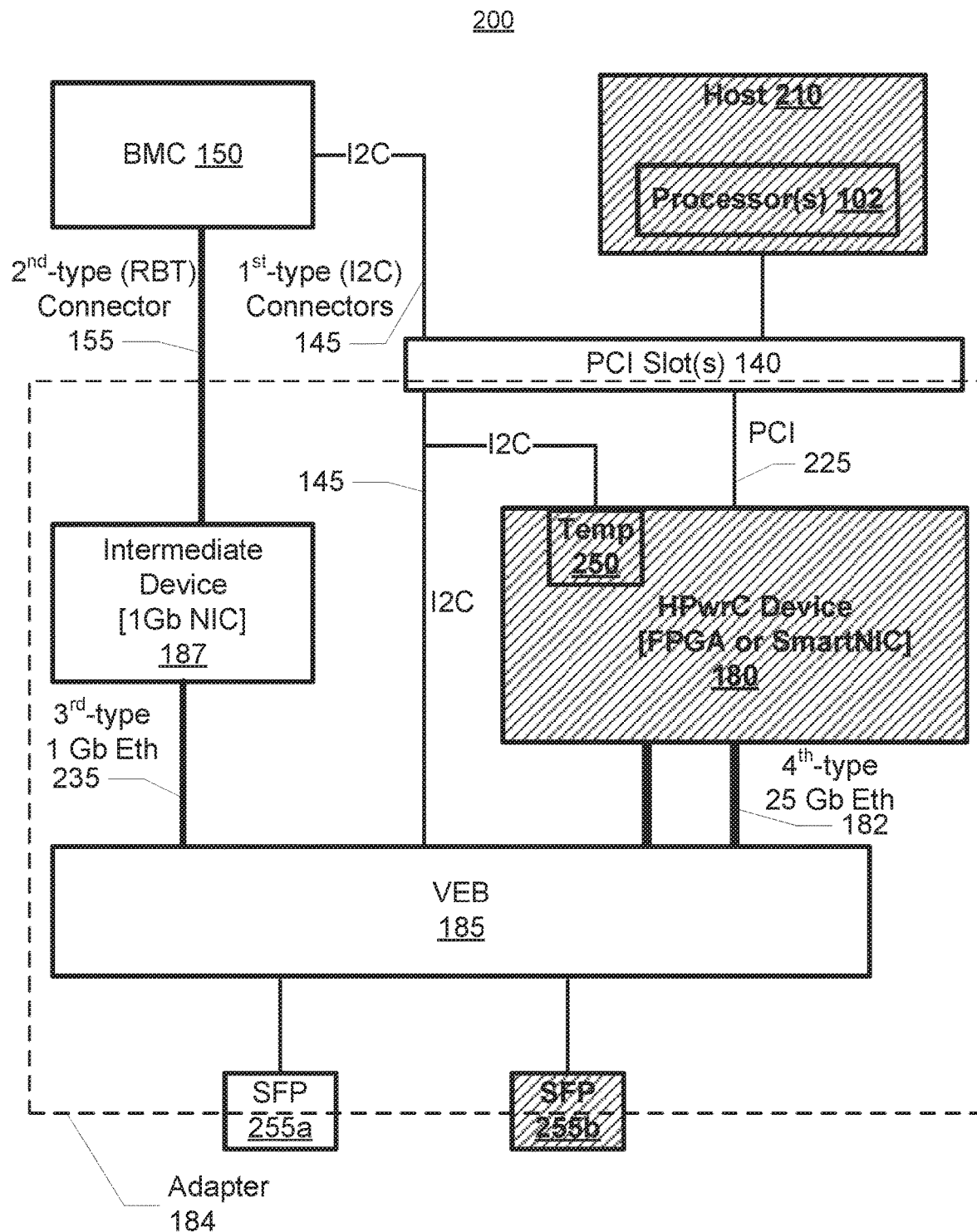
FIG. 2 illustrates a detailed block diagram representation of an interconnectivity between high power consuming (HPwrC) devices and auxiliary power (vAUX) components that enables controller-based management and configuration of components during a vAUX operating mode, according to one or more embodiments.

IHS 100 further includes board management controller (BMC) 150, which is coupled to PCH 104 via LPC bus 146. BMC 150 is in communication with NV memory 142, which has program instructions stored thereon that are usable by processors(s) 102 to enable remote management of IHS 100. For example, BMC 150 may enable a user to discover, configure, and manage IHS 100 (via BMC 150), setup configuration options, resolve and administer hardware or software problems, etc. Additionally or alternatively, BMC 150 may include one or more BMC firmware volumes, each volume having one or more firmware files used by the UEFI firmware interface to initialize and test components of IHS 100. BMC 150 includes a port/interface 325 that enables a second-type connector, RMII Based Transport (RBT) cable 155, to be mechanically coupled thereto, where RMMI represents "reduced media-independent interface". According to one aspect of the disclosure, a second end of RBT cable 155 is mechanically coupled to intermediate device 187 on PCI adapter 184 to established communication with between BMC 150 and intermediate device 187 (FIG. 1 and/or FIG. 2).

Figure 3:
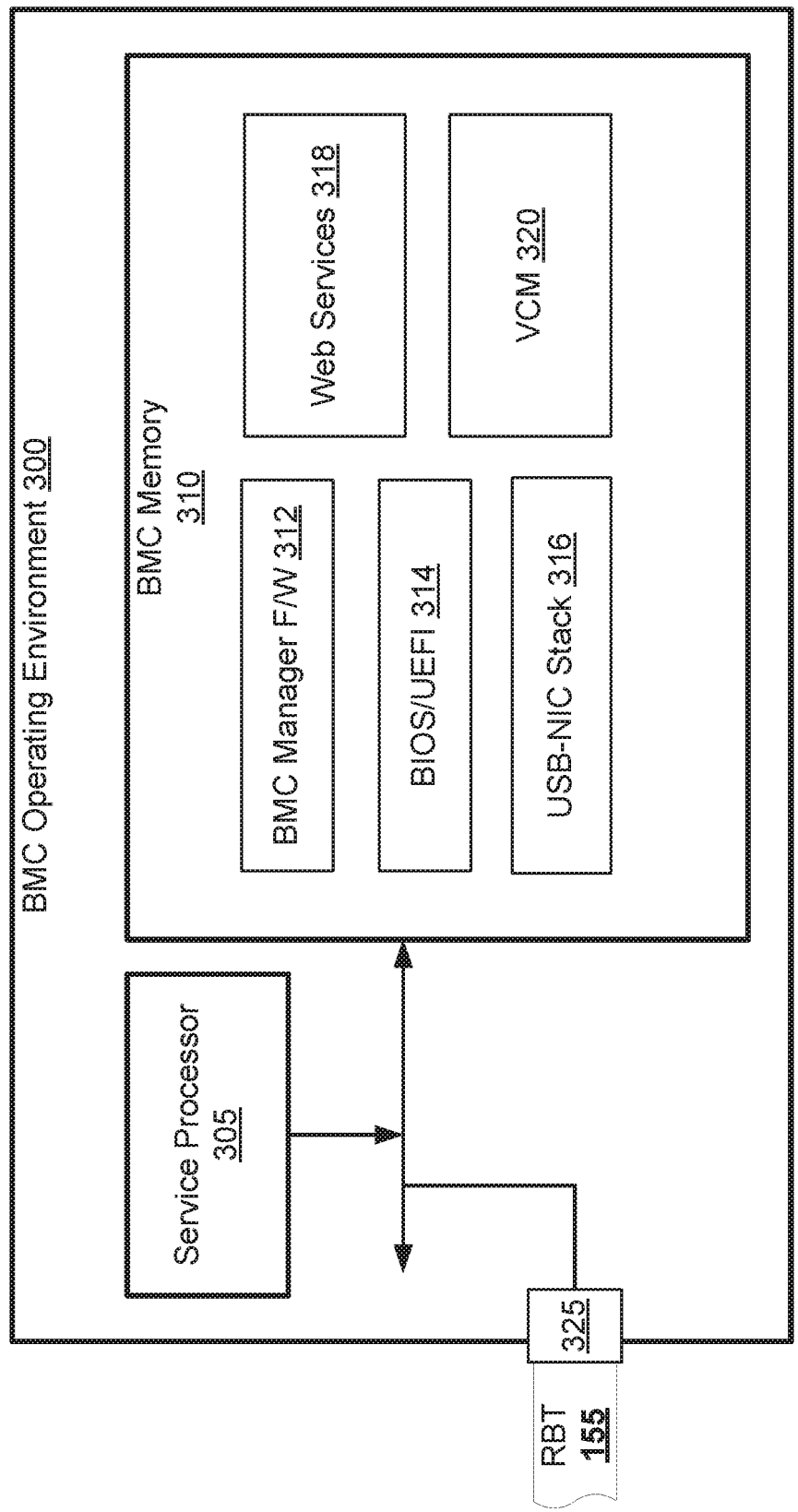
FIG. 3 is a block diagram representation of the component makeup of a baseboard management controller configured for discovery, management and configuration of a Virtual Ethernet Bridge (VEB) associated with a HPwrC device, in accordance with one embodiment.

FIG. 3 provides some additional details about the configuration of BMC 150. Specifically, FIG. 3 illustrates the component makeup of BMC 150. As shown, BMC comprises BMC memory 310 having stored thereon a plurality of software and/or firmware modules. These modules include, but are not limited to including, BMC manager firmware 312, BIOS/UEFI 314, USB-NIC stack 316, web services 318, and a discovered VEB configuration module (VCM) 320. BMC 150 also includes service processor 305, which executes the program code of/from VCM 320. According to one embodiment, at least a portion of the VCM code execution occurs while IHS 200 (FIG. 2) is in the vAUX operating mode.

In one implementation, BMC 150 is a specialized service processor that monitors the physical state of IHS 100, which can be a network server, and/or other hardware device using sensors. BMC 150 generally manages the infrastructure needs of the IHS, such as controlling power and cooling. BMC 100 can also be responsible for carrying out maintenance tasks received from a remote system. In such implementations, the BMC receives out-of-band communication over a network from an administrative console or development operations (DevOps) environment to schedule maintenance operations such as a firmware update or import server configuration profile.

In some cases, IHS 100 may be configured to access different types of computer-accessible media and/or computer readable medium, separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 104. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Referring again to FIG. 1, IHS 100 further includes one or more network interface controllers (NIC(s)) 160 coupled to PCH 104 via PCI bus 162. NIC(s) 160 enables IHS 100 to communicate and/or interface with other devices, services, and components (e.g., external computer 195) that are located external to IHS 100. These devices, services, and components can interface with IHS 100 via an external network, such as example network 170, using one or more communication protocols. In one embodiment, a customer provisioned system/platform can comprise multiple devices located across a distributed network, and NIC 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

In one embodiment, IHS 100 can further include a remote access controller (RAC) 175 coupled via a PCI bus (not shown) to PCH 104. RAC 175 provides management functions that allow an administrator to deploy, monitor, manage, configure, update, troubleshoot and remediate IHS 100.

RAC 175 can also be coupled to or include RAC memory (not shown), which in one embodiment, can be shared with processor(s) 102. RAC 175 is also communicatively coupled to NID(s) 160 via a sideband bus (not shown). RAC 175 monitors and controls the operation of IHS 100 and other systems and devices communicatively coupled to IHS 100. RAC 175 can also perform configuration and remote control of other connected IHSs. Certain software and/or firmware modules stored in RAC memory can be executed by RAC 175. Processor(s) 102 and RAC 175 include specific firmware that enables processor(s) 102 and RAC 175 to perform various functions. In one or more embodiments, the functionality of the RAC 175 can be integrated into the BMC 150, thus eliminating the need for a separate RAC component altogether.

According to one aspect of the disclosure, IHS 100 also includes PCI adapter 184, which is mechanically and communicatively coupled to PCI slot 140. PCI adapter 184 includes high power consuming (HPwrC) device 180 and VEB 185, which are connected to respective PCI slots 140 of PCI subsystem 136. VEB 185 is communicatively coupled to HPwrC device 180 via high bandwidth data/signal communication bus 182. IHS 100 further includes an intermediate device 187 that enables management pass-through operations for VEB 185 and HPwrC device 180 via a second-type (medium bandwidth) connector, RBT cable 155. Both HPwrC device 180 and VEB 185 are connected to PCI slot 140 via first-type (low bandwidth) connectors, which in the illustrative embodiment, are I2C connectors 145. Additional connectivity and features of these devices are illustrated and described in greater detail within the description of FIG. 2.

IHS 100 includes and is powered by power subsystem 190, which includes main power supply 192 and an auxiliary power supply 194. Main power supply provides electrical power to all power consuming components of IHS 100 via a main power rail 191 (illustrated as the lines extending from main power supply 192) when IHS is in a powered "on" state during which processors and other components that require main power, including HPwrC device 180, are fully operational. Auxiliary power supply 194 can be selectively activated when main power supply is disconnected from IHS (i.e., IHS is powered off or placed in a low power mode). Auxiliary power supply 194 provides a limited (lower value) power supply, via low/auxiliary power rail 193, to those low power consuming (LPC) devices, such as BMC 150, VEB 185, and intermediate device 187. When IHS 100 operates in auxiliary power (vAUX) mode, the higher power consuming devices remain in an off state. Power subsystem 190 is configurable to provide a selected one of the main power operating mode and the vAUX operating mode. In the main power operating mode, all devices, including host processor(s) 102, HPwrC device 180, and LPC devices (all other devices shown) are powered on and fully operational, and in the auxiliary power operating mode, host processor 102 and HPwrC device 108 are powered off and are thus non-operational, while the plurality of LPC components remain operational, powered by vAUX.

FIG. 2 illustrates a detailed block diagram representation of an interconnectivity between example high power consuming (HPwrC) devices and auxiliary power (vAUX) components that enables controller-based management and configuration of a VEB during a vAUX operating mode, based on connectivity to a HPwrC device 180 and to BMC 150, according to one or more embodiments. FIG. 2 provides an alternate view 200 of example IHS 100 with specific emphasis on the different connectivity among components/devices that can operate to manage and configure HPwrC device 180 during the vAUX operating mode and thereafter. FIG. 2 is described with continuing reference to FIG. 1. For purposes of differentiating the alternate view (200) of FIG. 2 from IHS 100 of FIG. 1, alternate view (200) of IHS 100 will be referred to hereinafter as IHS 200. Features associated with IHS 200 will be described from the perspective of the connectivity between components/devices and the functionality corresponding to the operation of the different components/devices based on the specific interconnectivity.

IHS 200 includes host system 210 having host processor(s) 102 communicatively connected to PCI slot 140 of PCI subsystem (136). As provided herein, host system 210 can include the majority of the various components of FIG. 1, minus those components expressly excluded from host system 210 in FIG. 2. Host system is primarily comprised of host processor(s) 102 and system memory (114) and storage (120). IHS 200 also includes device 180 communicatively coupled to slot 140 in the PCI backplane. According to the described embodiment, device 180 (also referred to as HPwrC device 180 and/or HPwrC PCI-connected device) requires IHS 200 to be in main/primary power (on) operating mode for HPwrC device 180 to operate. According to one aspect of the disclosure, HPwrC device 180 is configured to receive management and configuration instructions via a network controller sideband interface (NC-SI) connection. Host system 210 and HPwrC device 180 operate only while IHS 200 is being powered by the main power supply 192 such that IHS 200 is fully powered on. Additionally, at least one small form-factor pluggable (SFP) adapter 255b of VEB 185 is also only operational when IHS 200 is fully powered on. The devices that require main system power to be operational are illustrated by the use of diagonal shading provided within the corresponding component blocks representing host system 210, HPwrC device 180, and SFP adapter 255b. The remaining blocks that are not shaded, including SFP adapter 255a, represent a plurality of interconnected, low power consuming (LPC) components that operate in low power (vAUX) mode. According to one aspect, the plurality of interconnected LPC components enable system management interfacing with and configuration of the HPwrC device during a low/auxiliary power (vAUX) mode of IHS 200. The plurality of interconnected LPC components include VEB 185, which is communicatively coupled via a high bandwidth, direct communication path 182 to HPwrC device 180 and is communicatively coupled to PCI slot 140 of PCI backplane (136) via a first-type connector 145 supporting low bandwidth data communication. The plurality of interconnected LPC components also includes BMC 150, which is communicatively coupled to both VEB 185 and to HPwrC device 180 via a low bandwidth, first communication path. The low bandwidth, first communication path includes a plurality of the first-type connectors 145.

BMC 150 is further communicatively coupled to VEB 185 via a second communication path, that enables BMC 150 to perform the system management interfacing with and configuration of VEB 185, in part via routing BMC-provided management instructions and configuration data (collectively management traffic) over the second communication path through intermediate device 187 to VEB 185. According to one aspect, VEB is a non-learning switch, and VEB must be configured by BMC to assign/associate specific MAC/VLAN with each selected port. When management traffic is intended for the HPwrC device 180, VEB 185 forwards the BMC-provided management instructions and configuration data to HPwrC device 180 over the high bandwidth, direct communication path 182. According to the illustrative embodiment, the high bandwidth, direct communication path 182 includes a pair of 25 gigabyte (Gb) Ethernet cables.

Figure 4A:
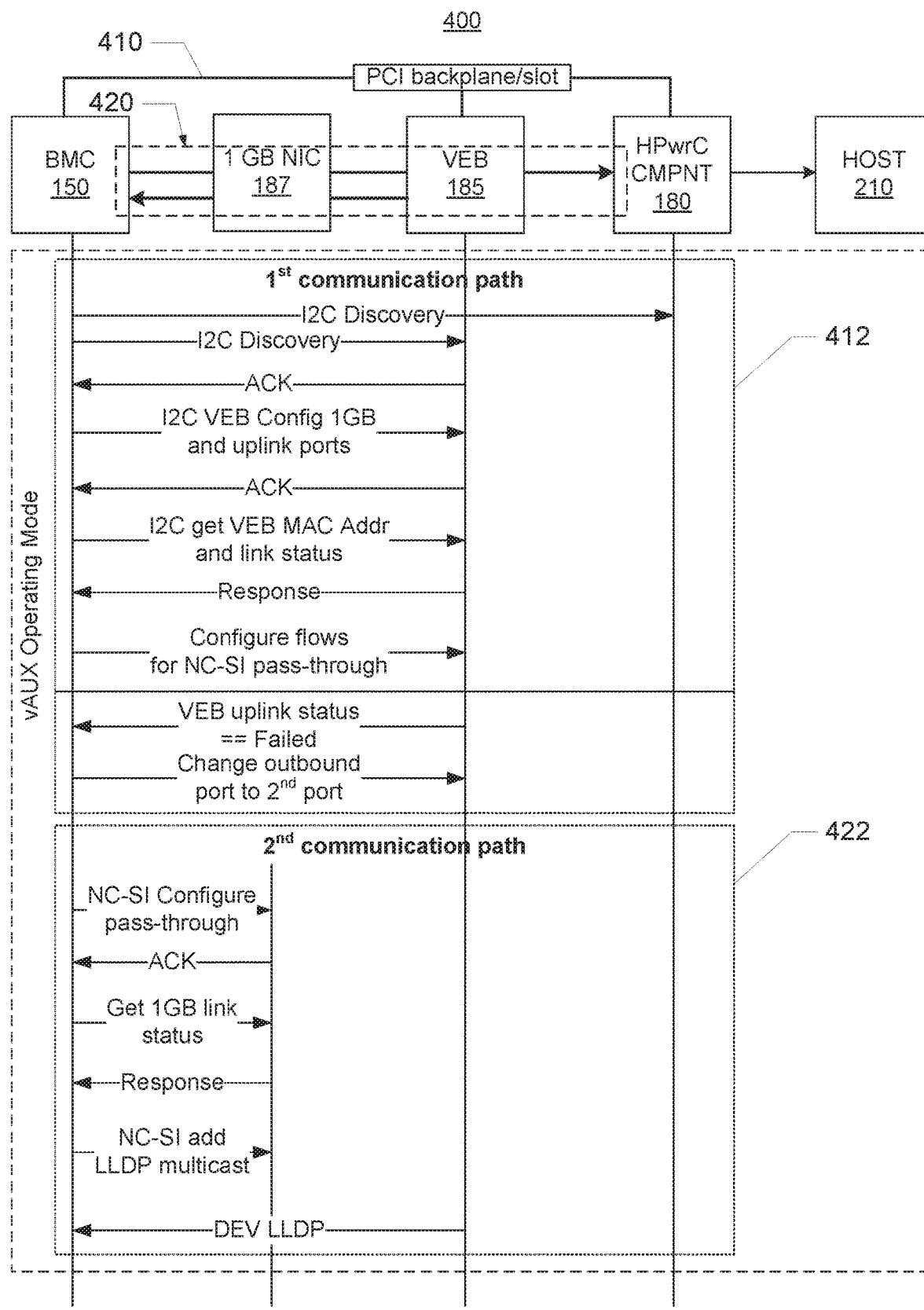
FIG. 4A provides an operational sequencing diagram illustrating a sequence of operations corresponding to management and configuration processes using both communication paths between a VEB and a controller during a vAUX operating mode, according to one or more embodiments.
Figure 4B:
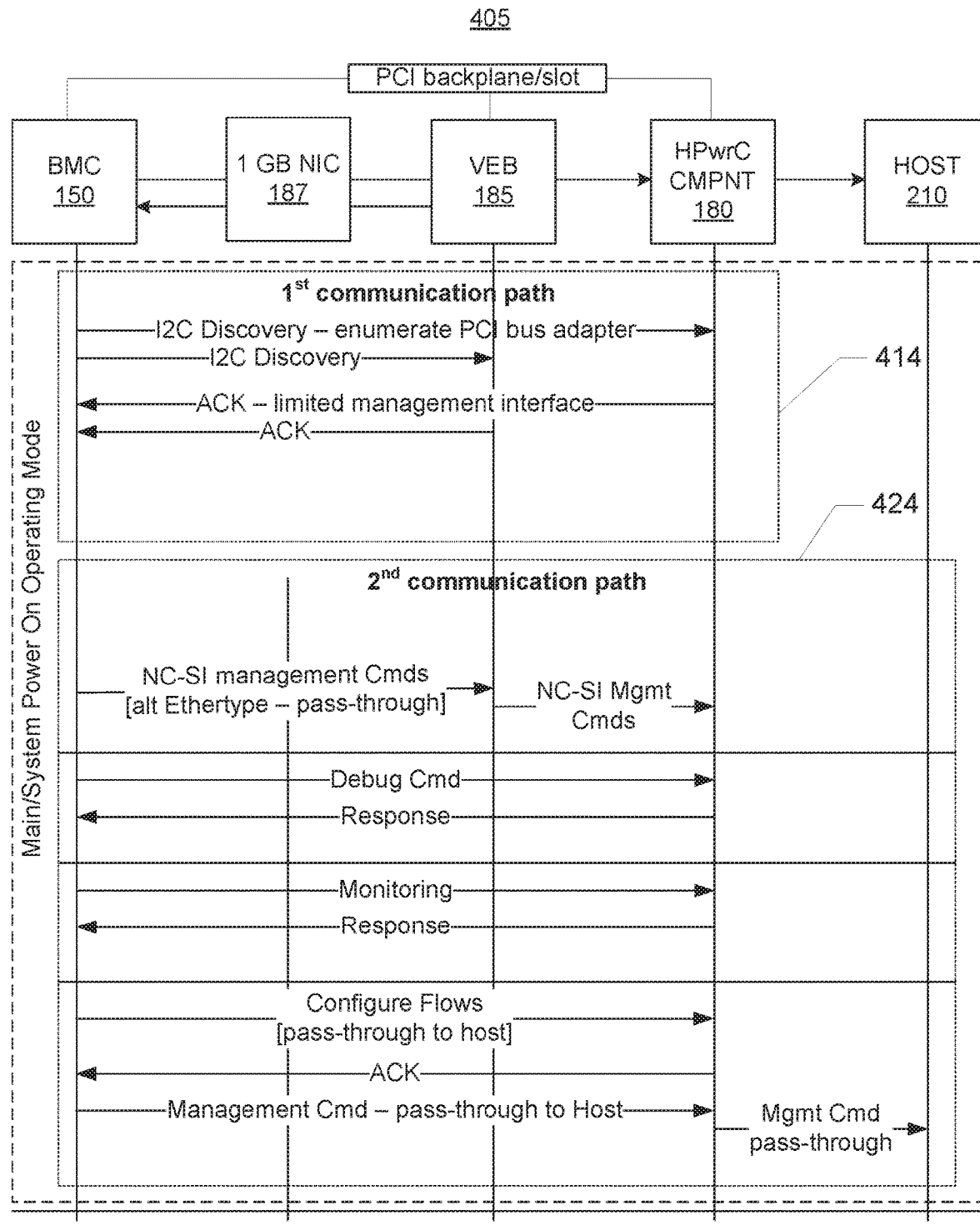
FIG. 4B provides an operational sequencing diagram illustrating a sequence of operations corresponding to management and routing processes using both communication paths between a VEB and a controller during main system power operating mode, according to one or more embodiments.

As provided by FIG. 2 (and further presented within FIGS. 4A and 4B), BMC 150 is communicatively coupled to VEB 185 via first communication path 410 (FIG. 4). First communication path 410 physically includes one or more slots 140 of PCI backplane and a plurality of first-type connectors 145 or signal traces that run on the motherboard. According to one embodiment, the second-type connector is an inter-integrated circuit (I2C) connector/cable. As known by those skilled in the art, I2C is a serial protocol for two-wire interface to connect low-speed devices, such as like microcontrollers, EEPROMs, A/D and D/A converters, I/O interfaces and other similar peripherals, in embedded systems.

Referring again to FIG. 2, as provided on the left, middle portion of the figure, the plurality of interconnected, LPC components includes intermediate (management) device 187 that is a communicatively coupled within the second communication path (420, FIG. 4) between VEB 185 and BMC 150. Intermediate device 187 is communicatively connected to VEB 185 via medium bandwidth, third-type connector 235, and intermediate device 187 is communicatively connected to BMC 150 via medium bandwidth second-type connector (155). According to one embodiment, third-type connector 235 is an Ethernet cable, and specifically a 1 gigabyte (Gb) Ethernet cable, within the illustrative embodiment. Additionally, according to one embodiment, second-type connector is RBT cable 155.

In one embodiment, intermediate device 187 is a small (or limited) capacity NIC, such as a 1 Gb NIC that can, in some embodiments, provide NC-SI management support, NC-SI pass-through, and basic management, to the BMC. With the small capacity NIC connected to BMC 150 via an RBT cable 155, BMC 150 performs a verification of the RBT cable connection, confirms a slot position of VEB within the PCI backplane, and identifies which adapter from among multiple adapters attached to the IHS 200 that BMC 150 will use to connected to an external network.

SmartNIC designs are typically implemented on PCIe adapter cards. Some SmartNIC applications require NC-SI pass-through and NC-SI sideband network connectivity to the BMC (150) for systems management. The present disclosure recognizes the constraints that exists on standard servers to provide NC-SI sideband connectivity and other management functions in vAUX operating mode. Implementing the described features of the present disclosure enables NC-SI pass-through and general systems management by using an available RBT cable with the VEB I2C connection and moving the VEB management to the BMC. With the software complexity transferred to the BMC, the intermediate management device, such as a 1 Gb NIC, is then utilized for connectivity only. The VEB is connected to the I2C pins on the adapter so that the VEB can be discovered and directly managed by the BMC.

It is appreciated that in the configuration of FIG. 2, PCI adapter 184 consumes two NIC slots from a normal server IHS. That is, PCI adapter 184 consumes both the network daughter card (NDC) slot, requiring the RBT cable 155, and one PCI slot. In an alternative embodiment, where the adapter card is configured with an open compute project 3 (OCP3) Large Form Factor, the PCI adapter (184) could fit mechanically and thermally into an NDC slot, such that the RBT cable 155 would not be required. In this alternate embodiment, the RBT cable detection process described herein would not be required (or important); However, the intelligence to configure the VEB so that sideband will work while the HPwrC device 180 is off is still required to be integrated into the BMC 150.

According to one aspect, whenever BMC 150 discovers the VEB 185, BMC 150 is preprogrammed to recognize that there is a SmartNIC or FPGA device with sideband enablement coupled to the PCI slot 140. BMC 150 is further pre-programmed to initiate additional operations, such as verifying RBT cable placement and configuration with tunneled NC-SI commands.

According to one aspect, since there is an Ethernet path from BMC 150 through the VEB 185 to the SmartNIC/FPGA (180), the Ethernet path (second commination path 155, 235) can be used for control and monitoring as well as SmartNIC console and debug. In some embodiments, where there are two or more cards in the IHS, with only one connected (cabled) to the VEB 185, BMC 150 is programmed to determine which card has the RBT cable 155 connected.

Thus, with the aforementioned specific configuration of the IHS, BMC 150 is preprogrammed to provide a series of processes during the vAUX operating mode. According to one embodiment, in response to identifying the VEB following auxiliary power on, BMC 150 identifies or assumes a presence of the SmartNIC/FPGA device with sideband enablement in the PCI slot and initiates operations to verify, with tunneled NC-SI commands, correct placement and configuration of the RBT cable. BMC 150 further configures, via the RBT cable, the small capacity 1 Gb NIC (intermediate device) 187 for NC-SI pass-through, which can include providing link parameters and a management MAC address of the controller. BMC 150 confirms a slot position of the VEB and correct placement of the RBT cable, and BMC 150 identifies which port (using SFP) of VEB that BMC 150 will use to connect to an external network. BMC 150 further provides additional functions and features by communicating with the other components and devices connected via the first and second communication paths, both during vAUX operating mode and during main power operating mode.

Referring now to FIGS. 4A and 4B and with continuing reference to FIG. 2, there are provided operational sequencing diagrams 400 illustrating a sequence of processes described herein involving communication between various components (e.g., VEB 185, controller (BMC 150), and intermediate device 187), on first and second communication paths during a vAUX operating mode (FIG. 4A) and a main power operating mode (FIG. 4B), according to one or more embodiments. According to one or more aspects of the disclosure, BMC 150 executes program code of VCM 320 (FIG. 3), which configures BMC 150 to perform the series of functional processes that collectively provides for the management and configuration of VEB 185. FIG. 4A provides a sequential presentation 400 of a first sequence of processes that occur during vAUX operating mode along each of the two communication paths, and FIG. 4B provides a sequential presentation 405 of a second sequence of processes that occur during main power operating mode. Each sequence begins with a process at the top of the dashed boxes, which respectively represent the first and the second communication paths, and then transitions downward to the lower processes in the respective dashed box. It is appreciated that while shown in a particular sequence, the actual sequence of completing some of the operations relative to each other can be different, across different embodiments.

The direction/flow of the communications between any two components/devices are indicated by directional arrows, which are presented with a brief description of the communication being represented by the arrow for ease of readability. As also illustrated, the directional arrows are presented as pairs involving an outbound inquiry/request or configuration traffic, typically originating from the BMC 150, and a corresponding acknowledgement (ACK) or response from the second component. It is appreciated that the specific description of the communication provided on the directional arrows differ somewhat from the description of the process provided herein, as the present description is more expansive and more closely aligns with the terminology being utilized within the general specification.

FIG. 4A illustrates communication exchanges by/between the various device that are powered on during the vAUX operating mode and which are interconnected via either the first communication path 410 (to enable the first sequence 412 of inter-device communication/exchanges illustrated in the top dotted box), or the second communication path 420 (to enable the second sequence 422 of inter-device communication/exchanges illustrated in the bottom dotted box). As shown in FIG. 2, during vAUX operating mode, only BMC 150, 1 Gb NIC 187, VEB 185, and 1 physical port (SFP) 255a are powered. BMC 150 exercises the defined I2C address in each PCI slot 140 (FIG. 1) to determine what devices are present. There are existing addresses in the I2C protocol reserved for NICs and FPGAs. And, according to one aspect of the present disclosure, a new address would be specified for each type of supported VEB device. If a supported VEB device responds on I2C (via an ACK or other response), BMC 150 performs basic configuration steps needed for sideband communication over I2C. The configuration steps include uplink port configuration on VEB 185 and setting a VLAN/MAC filter rule for NC-SI pass-through traffic in VEB 185. BMC 150 will also collect some basic information about VEB 185, such as the VEB's MAC address and capabilities.

On the second communication path (lower dashed box), BMC 150 then configures the 1 Gb NIC via the RBT cable for NC-SI pass-through, including providing link parameters and management MAC address. After initialization, VEB 185 can transmit LLDP packets containing the VEB's management MAC address and the local port designator for each of its ports. In one embodiment, the per port MACs is held by the HPwrC device 180 and the VEB operates similar to a switch. Once BMC 150 configures NC-SI pass-through on its connection with VEB 185, BMC will receive LLDP packets from the VEB 185. The MAC address from the received LLDP packet can be compared with the VEB MAC Address retrieved via I2C to verify the RBT cable's connectivity and confirm the slot position of the adapter (SFP 255a). If multiple VEB-based devices are installed in the same system, typically only one will be used for NC-SI pass-through communication from BMC 150. This MAC address comparison method allows BMC 150 to clearly identify the adapter (SFP) 255a being used for the BMC to connect with the external network.

Referring to FIG. 4A, BMC 150 undergoes an initialization process on receipt of vAUX power. Following the BMC initialization process, BMC 150 performs a series of discovery and configuration processes (i.e., first sequence 412) by communicating over first communication path 410. BMC 150 initiates a discovery operation by exercising defined I2C addresses in each PCI adapter in the IHS to discover devices connected to each PCI slot in the IHS. BMC 150 identifies when a supported VEB, e.g., VEB 185, responds to a discovery operation (e.g., by receiving an ACK or other response from the VEB). In response to identifying the supported VEB, BMC 150 initiates and performs configuration processes to enable sideband communication over the low bandwidth, first communication path with the supported VEB. According to one embodiment, as a result of discovering the VEB during the discovery operation during vAUX mode, BMC 150 also determines that HPwrC Component 180 with sideband enablement is present in PCI slot 140. According to one embodiment, to enable sideband communication over the low bandwidth, first communication path, BMC 150 configures an uplink port on the VEB. BMC 150 collects other information about the VEB. The information includes a first MAC address and link status (and/or other capabilities) of the VEB. BMC 150 then sets a virtual local area network (VLAN)/medium access control (MAC) filter rule for NC-SI pass-through traffic in VEB 185 and configures flows for NC-SI pass-through at the VEB.

According to one aspect, BMC 150 provides failover of management traffic, where BMC 150 monitors an uplink status of the VEB over the low bandwidth, first communication path. Then, in response to a primary outbound port losing a link, BMC 150 changes the primary outbound port for BMC traffic to a secondary outbound port.

BMC 150 performs a series of additional configuration processes (i.e., second sequence 422) that involves communicating over second communication path 420. It is appreciated that several of these processes may be performed concurrently with the processes occurring on the first communication path. Specifically, BMC 150 configures a NC-SI pass-through with intermediate device 187. BMC 150 configures, via the medium bandwidth second-type connector, the intermediate device 187 for NC-SI pass-through, including providing link parameters and a management MAC address. BMC 150 initiates operations to verify, with tunneled NC-SI commands, placement and configuration of the second-type connector (i.e., RBT cable 155) and obtain link status of the second-type connector. In response to verifying the link status of the first-type connector, BMC 150 configures second communication path for link layer discovery protocol (LLDP) multicast. VEB 185 transmits to BMC 150, via the second communication path, link layer discovery protocol (LLDP) packets containing an LLDP-embedded MAC address of the VEB 185. BMC 150 receives the LLDP packets from the VEB via the second communication path, and BMC 150 verifies the second communication path with the VEB 185 by comparing the LLDP-embedded MAC address within the received LLDP packets with the first MAC address received via the low bandwidth, first communication path. Then, in response to verifying the secondary communication path, BMC 150 configures NC-SI pass-through on the second communication path with the VEB.

FIG. 4B provides communication exchanges by/between the various device that are powered on during main power operating mode and which are interconnected via both the first communication path (e.g., I2C connection) and the second communication path (with intermediate device). When main power is applied, the HPwrC device (i.e., FPGA or SmartNIC) become powered, and BMC 150 implements a third sequence 414 of discovery processes that are preformed over first communication path (410). Specifically, BMC 150 enumerates the installed PCI bus adapters in the system and will detect the management interface of the HPwrC device. BMC 150 then commences management operations, and additional sensors can then be polled over I2C to enable closed loop thermal solutions.

BMC 150 also implements a fourth sequence 424 of processes, which involves communication exchanges over second communication path 420. According to one embodiment, BMC 150 determines whether the HPwrC device 180 only supports thermal reporting over the first communication path. In response to determining that the device/component supports only thermal reporting over the first communication path, BMC 150 sends NC-SI management commands to the VEB as pass-through traffic using an alternative Ethertype other than the NC-SI-defined standard of 0x88F8. Thus, the NC-SI management commands are routed (passed) through intermediate device 187 and are routed by the VEB 185 to HPwrC device 180 for execution. As examples, the NC-SI management commands can include detecting link state for both links and port statistics. As additional examples, NC-SI management commands can include NC-SI OEM commands for getting and setting capabilities on HPwrC device 180. It is appreciated that in an alternate embodiment, this functionality involving the use of locally assigned Ethertypes of 0x88B5 and 0x88B6 can be replaced by utilizing another Ethertype that is reserved for this specific purpose/use.

According to the illustrative embodiment, the second communication path 420 includes at least one 1 Gb Ethernet connection (third-type connector 235, FIG. 2) between BMC 150 and VEB 185 to HPwrC device 180. And, according to another aspect of the disclosure, BMC 150 controls and monitors the HPwrC device 180 via the at least one Ethernet connection. BMC 150 also debugs (by sending debug commands to) the HPwrC device 180 via the at least one Ethernet connection. Additionally, according to yet another aspect, BMC 150 configures directional flows on the HPwrC device 180 to allow traffic to flow through to the host processor 202 when host operating system-to-BMC pass-through communication is required.

Figure 5:
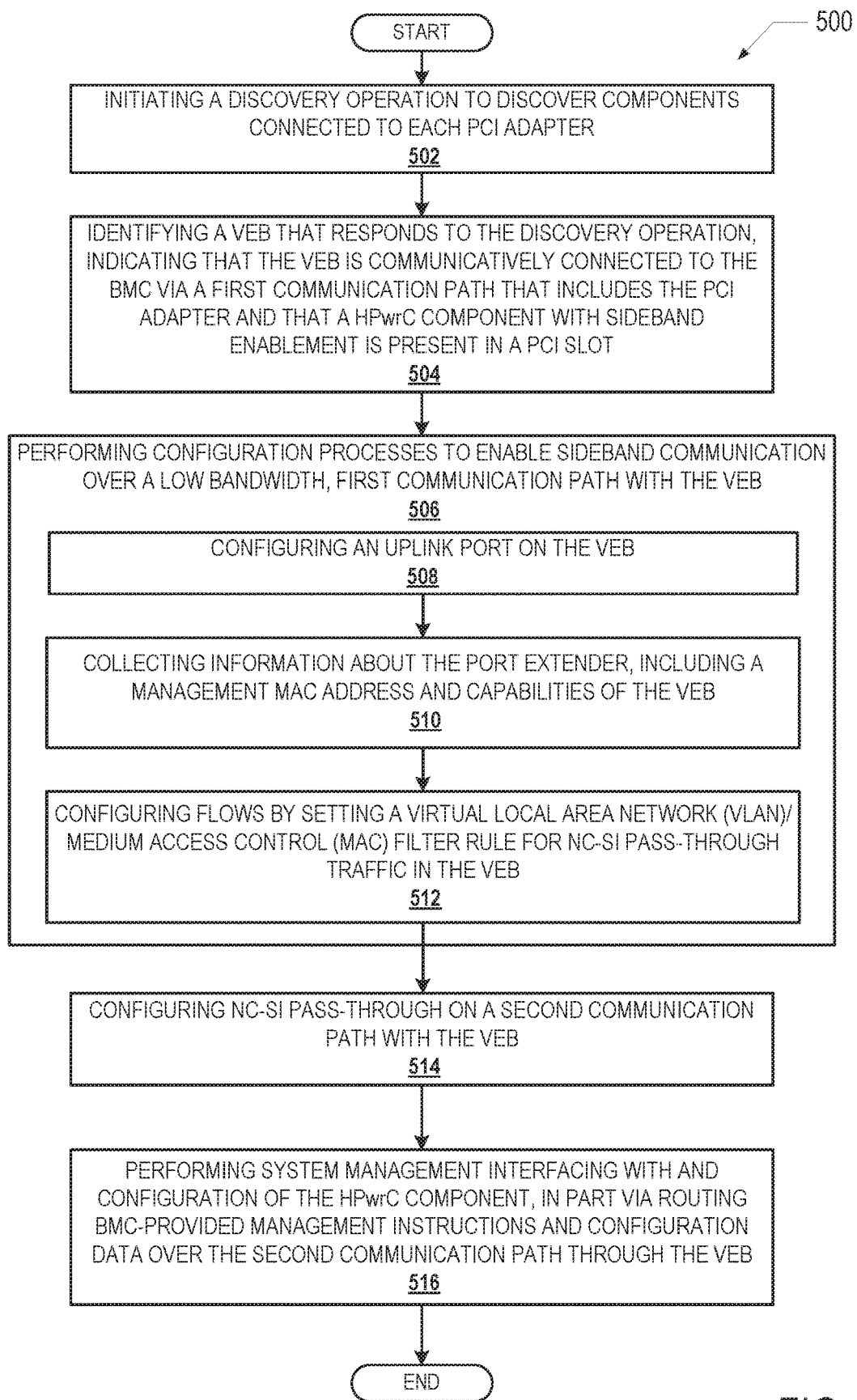
FIG. 5 is a flow diagram illustrating a method for discovering, verifying, and configuring a VEB using a board controller of the IHS, according to one or more embodiments.
Figure 6:
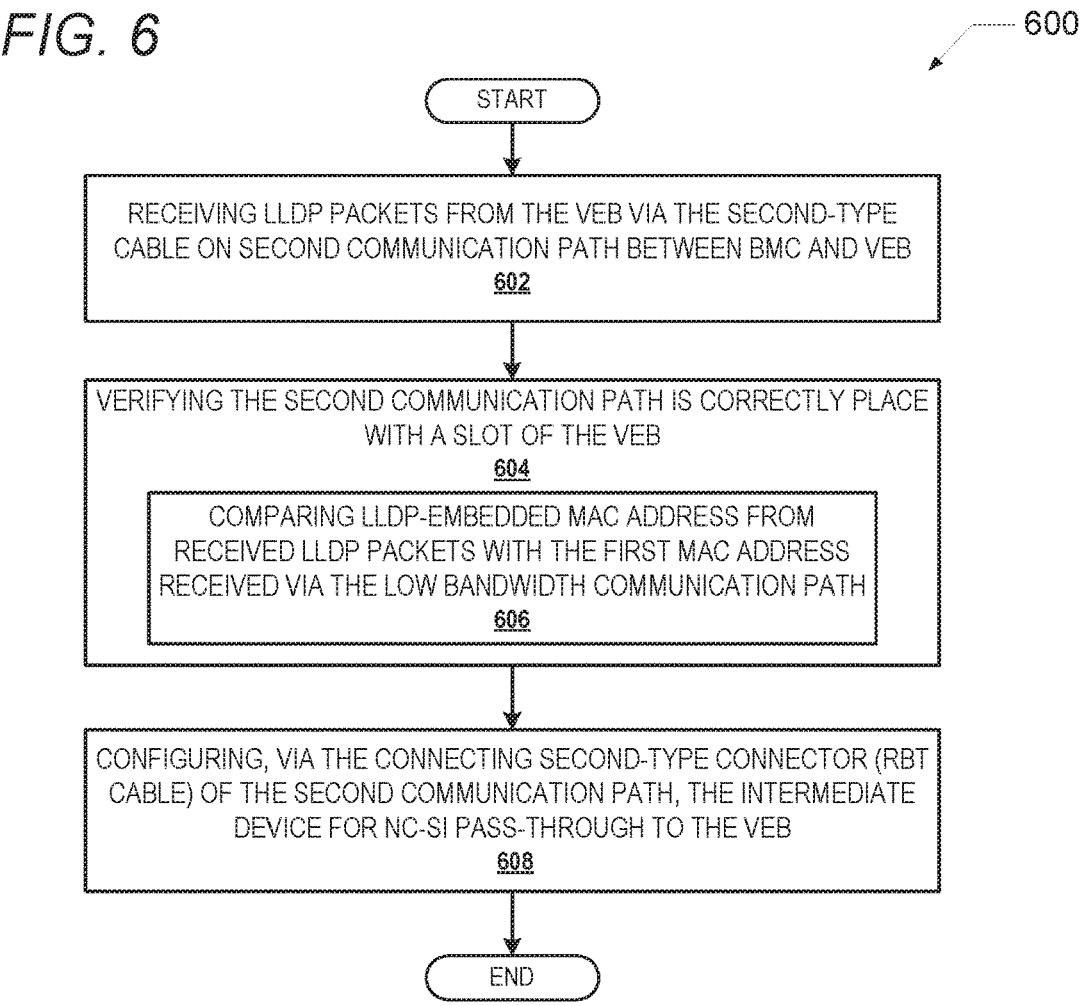
FIG. 6 is a flow diagram illustrating a method for configuring an intermediary device coupled along a secondary path between a VEB and a controller to enable management and configuration for pass through handling of traffic, according to one or more embodiments.
Figure 7:
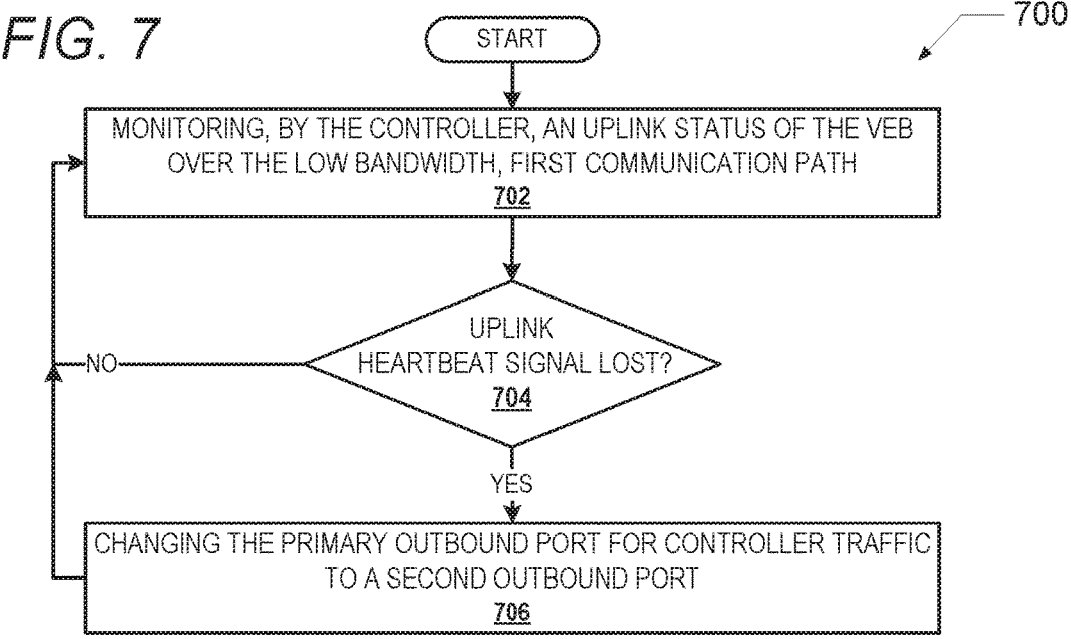
FIG. 7 is a flow diagram illustrating a method for failover of management traffic, according to one or more embodiments.
Figure 8:
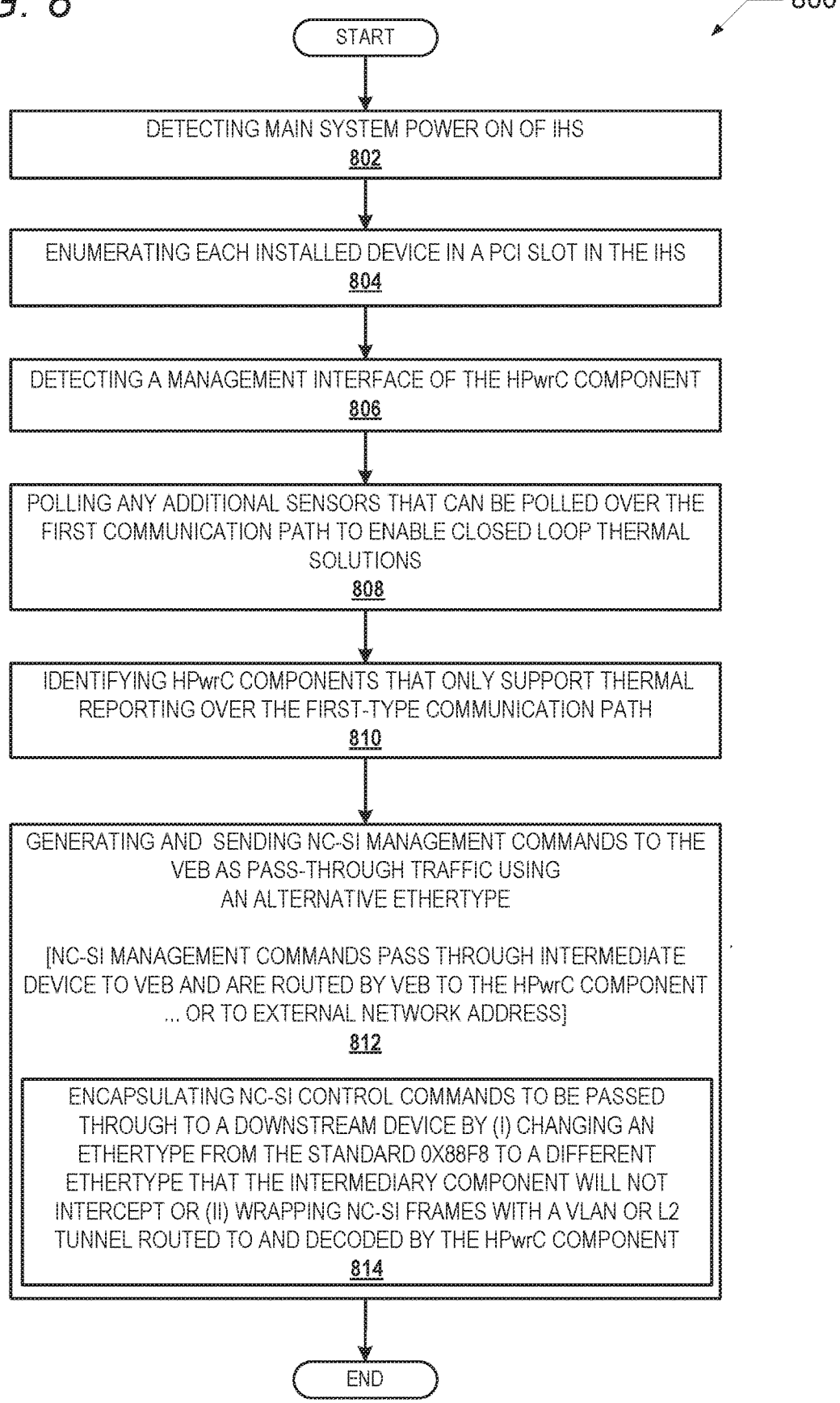
FIG. 8 is a flow diagram illustrating a method for communicating management information via a VEB to a HPwrC device during main system power on, in accordance with one or more embodiments.

With reference now to the flow charts of FIGS. 5-8, which provide various methods covering different aspects of the disclosure. Specifically, FIGS. 5 and 6 present different aspects of one or more methods for adding or enabling network controller sideband interface (NC-SI) shared LAN on motherboard (LOM) and management of an information handling system (IHS) having at least one HPwrC device and a VEB coupled to a PCI slot. FIGS. 7 and 8 then presents aspects of BMC 150 operating during main power operating mode to interface with the VEB communicating traffic into and out of VEB 185 including providing pass through traffic to HPwrC device 180.

As described above within the description of FIG. 3, BMC 150 includes BMC memory 310 having stored thereon a discovered VEB configuration module (VCM) 320. BMC 150 also includes service processor 305 communicatively coupled to BMC memory 310 and that, while the IHS is in a low/auxiliary power (vAUX) mode, executes VCM 320, which configures BMC 150 to perform the method processes presented within FIGS. 5-8, as described below. While each of methods 500-800 is described as being performed by BMC 150, it is appreciated that certain aspects of each method 500-800 can be provided by other components within IHS 200 operating in concert with BMC 150.

Method 500 begins at start block and proceeds to block 502, where method 500 includes initiating a discovery operation, via a baseboard management controller (BMC) exercising defined I2C addresses in each PCI adapter in the IHS, to discover components connected to each PCI adapter in an information handling system. Method 500 includes identifying a supported VEB that responds to the discovery operation, indicating that the supported VEB is communicatively connected to the BMC via a first communication path that includes the PCI adapter (block 504). Identifying the supported VEB also enables BMC to determine the presence, in a PCI slot, of a HPwrC device with sideband enablement. At block 506, in response to BMC 150 identifying the supported VEB, method includes performing configuration processes to enable sideband communication over a low bandwidth, first communication path with the VEB. According to one embodiment, enabling sideband communication over the first communication path includes a series of method processes illustrated as sub-blocks within block 506. These processes including configuring an uplink port on the VEB (block 508), and collecting information about the VEB, the information including a MAC address and capabilities of the VEB (block 510). The process further includes configuring flows for NC-SI pass-through by setting a virtual local area network (VLAN)/medium access control (MAC) filter rule for NC-SI pass-through traffic in the VEB (block 512). Method 500 further includes configuring NC-SI pass-through on a second communication path with the VEB (block 514). At block 516, method 500 then includes performing system management interfacing with and configuration of the HPwrC device, in part via routing BMC-provided management instructions and configuration data over the second communication path through the VEB. The VEB then forwards the BMC-provided management instructions and configuration data to the HPwrC device over the high bandwidth, direct communication path between the VEB and the HPwrC device.

Turning now to FIG. 6, there is provided a flow chart illustrating method 600 by which BMC 150 completes the configuration process, to configure NC-SI passthrough of the VEB, via the intermediate device, following discovery of the VEB and HPwrC device. As described above and illustrated by FIG. 2, the intermediate device 187 is connected to BMC (controller) 150 via a second-type connector with corresponding first transmission protocol, and BMC 150 performs the processes of method 600 to configure the intermediate device 187. According to one aspect, method 600 includes verifying the correct/proper placement of the second-type connector (RBT cable 155) relative to the VEB by using LLDP over NC-SI.

Method 600 begins at start block and proceeds to block 602 at which method 600 includes receiving LLDP packets from the VEB 185 via the second communication path between the BMC 150 and the VEB 185. Method 600 includes verifying that the second-type connector along the second communication path is correctly placed within a port of the discovered VEB that was configured by BMC 150 using first-type communication exchange (i.e., I2C) over first communication path (block 604). According to the illustrative embodiment, the verification includes comparing an LLDP-embedded MAC address from the received LLDP packets with the first MAC address received via the first communication path (block 606). Method 600 then includes configuring, via the connecting (second-type/RBT) cable of the second communication path, the intermediate device for NC-SI pass-through to the VEB (block 608). Method 600 then ends.

FIG. 7 provides method 700 by which controller 150 provides failover of management traffic. Method 700 begins at start block and proceeds to block 702 which includes monitoring, by the controller, an uplink status of the VEB 185 over the low bandwidth, first communication path. Method 700 includes determining, at decision block 704, whether a heartbeat (or other type) signal for the uplink has been lost, indicating that the uplink on the primary outbound port of the VEB is no longer functioning or available. In response to a primary outbound port losing its link or no longer being available (e.g., as determined by loss of the heartbeat signal), method 700 includes changing the primary outbound port for controller traffic to a second outbound port (block 706). The second outbound port is then treated as and/or assumes the roles of a primary outbound port that is monitored.

FIG. 8 provides a flow chart of method 800 for identifying and managing the HPwrC devices following main power on of the IHS. Following start block, method 800 begins at block 802 with BMC 150 detecting a main system power on, which enables IHS to be placed in main power operating mode. In response to the IHS being placed in main power operating mode, method 800 includes enumerating each installed device (e.g., PCI bus adapters) in a PCI slot 140 in the IHS (block 804). Method further includes detecting a management interface of the detected HPwrC device (block 806) and polling any additional sensors that can be polled over the first communication path to enable closed loop thermal solutions (block 808). Method 800 also includes identifying HPwrC devices that provide only thermal reporting over the first communication path (block 810). Then, method includes, in response to determining that the HPwrC device supports/provides only thermal reporting over the first communication path (i.e., does not support management and configuration communication features), generating and sending NC-SI frames to the VEB 185 as pass-through traffic by using an alternative Ethertype on the second communication path (block 812). The NC-SI frames pass through the intermediate device and are routed by the VEB to either an external network address or to the HPwrC device, based on a destination address provided within the NC-SI frames.

According to one embodiment, the alternative Ethertype is a selected Ethertype that is not the NC-SI-defined standard of 0x88F8. According to one embodiment, generating the pass-through traffic includes encapsulating NC-SI control commands to be passed through to a downstream device (block 814). The encapsulating includes performing one of (i) changing an Ethertype from the standard 0x88F8 to a different Ethertype that the intermediary device will not intercept and that the intermediary device will allow to pass through as NC-SI pass-through frames and (ii) wrapping NC-SI frames with a VLAN or L2 tunnel that is routed to and decoded by the HPwrC device (block 814).

In the above described flow charts of FIGS. 5-8 one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) having a main power operating mode that provides power for all components of the IHS to be operational and a lower power, auxiliary power (vAUX) mode that provides only sufficient power for operating a plurality of low power consuming (LPC) components, the IHS comprising:
   a host system comprising a host processor;
   a device communicatively coupled to the host system via a first peripheral component interconnect (PCI) slot, the device being a high power consuming (HPwrC) device that operates only while the IHS is in the main power operating mode;
   a Virtual Ethernet Bridge (VEB) communicatively coupled via at least one high bandwidth connector to the HPwrC device and communicatively coupled to a second PCI slot via a first-type connector, wherein the VEB is included in the LPC components;
   a controller communicatively coupled to the VEB via a first communication path having lower bandwidth connections comprising the first-type connector and the second PCI slot and a next connector between the second PCI slot and the controller, the controller further communicatively coupled to the VEB via a second communication path having higher bandwidth connecting cables, wherein the controller is one of the LPC components and completes, while the IHS is in the vAUX mode:
      (i) discovery, management, and configuration of the VEB; and
      (ii) verification and configuration of the second communication path to provide management interfacing with and configuration of the VEB and the HPwrC device to enable selective routing and pass-through functionality for controller-provided and controller-received traffic over the second communication path through the VEB, the configuration of the second communication path comprising configuring an intermediate device; and
   the intermediate device, wherein the intermediate device is communicatively coupled within the second communication path between the VEB and the controller, the intermediate device connected to the VEB via a third-type connector and the intermediate device connected to the controller via a second-type connector, the intermediate device enabling translation services between a first communication protocol and a second communication protocol respectively supported by the third-type and second-type connectors.

2. The IHS of claim 1, wherein the VEB is configured to selectively: forward, via the second communication path, to the controller, traffic addressed to a MAC address of the controller and received from a connected network; forward other received traffic to the device; and forward to the device via the at least one high bandwidth communication path, any incoming traffic intended for the device, including controller-provided management instructions and configuration data and incoming network-originating traffic.

3. The IHS of claim 1, wherein the controller, while the IHS is in the vAUX operating mode:
   initiates, on the first communication path, a discovery operation to discover devices connected to each PCI slot in the IHS;
   identifies when a supported VEB responds to the discovery operation; and
   in response to identifying the supported VEB, performs configuration of the supported VEB to enable sideband communication over the first communication path with the supported VEB.

4. The IHS of claim 3, wherein to enable sideband communication over the first communication path, the controller:
   configures an uplink port on the VEB;
   collects information about the VEB, the information comprising a VEB MAC address and capabilities of the VEB; and
   sets a virtual local area network (VLAN)/medium access control (MAC) filter rule for network controller sideband interface (NC-SI) pass-through traffic in the VEB.

5. The IHS of claim 1, wherein, during the vAUX operating mode:
   the VEB transmits to the controller, via the second communication path, link layer discovery protocol (LLDP) packets containing an LLDP-embedded MAC address for the VEB; and
   the controller:
      receives the LLDP packets from the VEB via the second communication path;
      verifies the second communication path with the VEB by comparing the LLDP-embedded MAC address within the received LLDP packets with a VEB MAC address received via the first communication path; and
      in response to verifying the second communication path, configures network controller sideband interface (NC-SI) pass-through on the second communication path with the VEB.

6. The IHS of claim 1, wherein further, the controller provides failover of management traffic, wherein the controller:
   monitors an uplink status of the VEB via the low bandwidth, first communication path; and
   in response to a primary outbound port losing a link to an external network, changes the primary outbound port for controller traffic to a secondary outbound port.

7. The IHS of claim 1,
   wherein the intermediate device is a small capacity NIC, the second-type connector is a reduced media-independent interface (RMII) based transport (RBT) cable, and the controller, in response to discovering the VEB following auxiliary power on:
      identifies a presence of the device with sideband enablement in the first PCI slot;
      initiates operations to verify, with tunneled NC-SI commands, correct placement and configuration of the RBT cable;
      confirms a slot position of the VEB;
      identifies which adapter of multiple adapters attached to the IHS that the controller will use to connect to an external network; and
      configure, via the RBT cable, the intermediate device for NC-SI pass-through, the configuring including providing link parameters and a management MAC address of the controller.

8. The IHS of claim 1, wherein the controller, in response to the IHS being placed in main power operating mode:
   enumerates each PCI-slot installed device in the IHS;
   detects a management interface of the device;
   polls for additional sensors that can be polled over the first-type connectors to enable closed loop thermal solutions;
   initiates management operations of the VEB and the device from the controller;
   identifies devices that support only thermal reporting over the first communication path; and
   in response to determining that the device supports only thermal reporting over the first communication path, sends NC-SI management commands to the VEB as pass-through traffic using an alternative Ethertype, whereby the NC-SI management commands pass through an intermediate device and are routed by the VEB to the device for management and configuration of the device.

9. The IHS of claim 8, wherein:
   the second communication path comprises at least one Ethernet connection between the controller and the VEB; and
   the controller:
      controls and monitors the device via the at least one Ethernet connection;
      performs debugging of the device via the at least one Ethernet connection; and
      configures directional flows on the device to allow traffic to flow through to the host system when host-to-controller pass-through communication is required.

10. A method for enabling network controller sideband interface (NC-SI) shared LAN on motherboard (LOM) and management of an information handling system (IHS) having at least one high power consumption (HPwrC) device and a Virtual Ethernet Bridge (VEB) coupled to a first peripheral component interconnect (PCI) slot, the IHS also having a main power operating mode that provides power for all components of the IHS to be operational and a lower power, auxiliary power (vAUX) mode that provides only sufficient power for operating a plurality of low power consuming (LPC) components including the VEB, the method comprising:
   initiating, by a controller of the IHS during an auxiliary power (vAUX) operating mode, a discovery operation to identify which devices are connected to peripheral component interconnect (PCI) slots in the IHS;
   identifying, by the controller, when the VEB provides a response on a first communication path linked to the PCI slots, which response indicates that the VEB is communicatively connected to the controller via the first communication path from the first PCI slot using a first type low bandwidth connector;
   identifying, by the controller, that a HPwrC device with sideband enablement is present in a second PCI slot, the VEB communicatively coupled via at least one high bandwidth connector to the HPwrC device; and
   in response to identifying the VEB is communicatively connected to the controller via the first communication path having lower bandwidth connections:
      configuring, via the first communication path, an uplink port on the VEB;
      collecting information about the VEB, the information comprising a VEB MAC address and capabilities of the VEB;
      configuring flows for NC-SI pass-through in the VEB; and
      configuring an intermediate device within a second communication path between the controller and the VEB, the configuring comprising configuring the intermediate device for NC-SI pass-through, including link parameters and a management MAC address, wherein the controller is also communicatively coupled to the VEB via the second communication path having higher bandwidth connecting cables, and the controller is one of the LPC components and completes, while the IHS is in the vAUX mode: (i) discovery, management, and configuration of the VEB; and (ii) verification and configuration of the second communication path to provide management interfacing with and configuration of the VEB and the HPwrC device to enable selective routing and pass-through functionality for controller-provided and controller-received traffic over the second communication path through the VEB;
   wherein the intermediate device is communicatively coupled within the second communication path between the VEB and the controller, the intermediate device connected to the VEB via a third-type connector and the intermediate device connected to the controller via a second-type connector, the intermediate device enabling translation services between a first communication protocol and a second communication protocol respectively supported by the third-type and second-type connectors.

11. The method of claim 10, wherein configuring flows for the NC-SI pass-through further comprises:
   initiating, on the first communication path while the IHS is in the vAUX operating mode, a discovery operation to discover devices connected to each PCI slot in the IHS;
   identifying when a supported VEB responds to the discovery operation; and
   in response to identifying the supported VEB, performing configuration of the supported VEB to enable sideband communication over the first communication path with the supported VEB, by:
      configuring an uplink port on the VEB;
      collecting information about the VEB, the information comprising a VEB MAC address and capabilities of the VEB; and
      setting a virtual local area network (VLAN)/medium access control (MAC) filter rule for NC-SI pass-through traffic in the VEB.

12. The method of claim 11, wherein, the intermediate device is connected to the controller via the second-type connector with corresponding first transmission protocol, and configuring the intermediate device comprises:
   receiving, from the VEB via the second communication path, link layer discovery protocol (LLDP) packets containing an LLDP-embedded MAC address for the VEB;
   verifying that the second-type cable along the second communication path is correctly placed within a port of the discovered VEB that was configured by the controller, the verifying comprising comparing the LLDP-embedded MAC address within the received LLDP packets with the VEB MAC address received via the first communication path; and
   in response to the LLDP-embedded MAC address matching the VEB MAC address, configuring, via the second-type cable, the intermediate device for network controller sideband interface (NC-SI) pass-through traffic to the VEB.

13. The method of claim 10, further comprising providing failover of management traffic by:
monitoring, by the controller, an uplink status of the VEB over the low bandwidth, first communication path; and
in response to a primary outbound port losing a link, changing the primary outbound port for controller traffic to a second outbound port.

14. The method of claim 10, wherein, in response to the IHS being placed in main power operating mode, the method comprises:
enumerating each connected device in one of the PCI slots in the IHS;
detecting a management interface of the device;
identifying whether the connected device provides only thermal reporting over the first communication path; and
in response to determining that the connected device provides only thermal reporting over the first communication path, sending NC-SI frames to the VEB as pass-through traffic by using an alternative Ethertype on the second communication path, wherein the NC-SI frames pass through the intermediate device and are routed by the VEB to either an external network address or to the device based on a destination address provided within the NC-SI frames.

15. The method of claim 10 wherein the intermediate device is a small capacity NIC, the second-type connector is a reduced media-independent interface (RMII) based transport (RBT) cable, and, in response to identifying the VEB following auxiliary power on, the method further comprises:
identifying a presence of the device with sideband enablement in the first PCI slot;
initiating operations to verify, with tunneled NC-SI commands, correct placement and configuration of the RBT cable;
configuring, via the RBT cable, the intermediate device for NC-SI pass-through, the configuring including providing link parameters and a management MAC address of the controller;
confirming a slot position of the VEB; and
identifying which adapter of multiple adapters attached to the IHS that the controller will use to connect to an external network.

16. A controller of an information handling system (IHS) having a main power operating mode that provides power for all components of the IHS to be operational and a lower power, auxiliary power (vAUX) mode that provides only sufficient power for operating a plurality of low power consuming (LPC) components, the controller comprising:
a memory having stored thereon a discovered Virtual Ethernet Bridge (VEB) configuration module (VCM); and
a service processor communicatively coupled to the memory and that, while the IHS is in an auxiliary power (vAUX) operating mode, executes the VCM, which configures the controller to:
initiate, during the vAUX operating mode, a discovery operation to identify which devices are connected to peripheral component interconnect (PCI) slots in the IHS;
identify when a VEB responds on a first communication path linked to a first PCI slot, which response indicates that the VEB is communicatively connected to the controller via the first communication path from the PCI slot using a low bandwidth, first type connector;
identify that a HPwrC device with sideband enablement is present in a second PCI slot, the VEB communicatively coupled via at least one high bandwidth connector to the HPwrC device; and
in response to identifying the VEB is communicatively connected to the controller via the first communication path having lower bandwidth connections:
configure, via the first communication path, an uplink port on the VEB;
collect information about the VEB, the information comprising a VEB MAC address and capabilities of the VEB;
set a virtual local area network (VLAN)/medium access control (MAC) filter rule to configure flows for network controller sideband interface (NC-SI) pass-through in the VEB; and
configure an intermediate device within a second communication path between the controller and the VEB, the configuring comprising configuring the intermediate device for NC-SI pass-through, including link parameters and a management MAC address;
wherein the controller is also communicatively coupled to the VEB via the second communication path having higher bandwidth connecting cables, and the controller completes, while the IHS is in an auxiliary power (vAUX) mode: (i) discovery, management, and configuration of the VEB; and (ii) verification and configuration of the second communication path to provide management interfacing with and configuration of the VEB and the HPwrC device to enable selective routing and pass-through functionality for controller-provided and controller-received traffic over the second communication path through the VEB; and
wherein the intermediate device is a communicatively coupled within the second communication path between the VEB and the controller, the intermediate device connected to the VEB via a third-type connector and the intermediate device connected to the controller via a second-type connector, the intermediate device enabling translation services between a first communication protocol and a second communication protocol respectively supported by the third-type and second-type connectors.

17. The controller of claim 16, wherein, the intermediate device is connected to the controller via a second-type connector with corresponding first transmission protocol, and configuring the intermediate device comprises the VCM configuring the controller to:
receive, from the VEB via the second communication path, link layer discovery protocol (LLDP) packets containing an LLDP-embedded MAC address for the VEB;
verify that the second-type connector along the second communication path is correctly placed within a port of the discovered VEB that was configured by the controller, by comparing the LLDP-embedded MAC address within the received LLDP packets with the VEB MAC address received via the first communication path; and
in response to the LLDP-embedded MAC address matching the VEB MAC address, configure, via the second-type connector, the intermediate device for NC-SI pass-through traffic to the VEB.

18. The controller of claim 16, wherein the VCM configures the controller to provide failover of management traffic, wherein the controller:
monitors an uplink status of the VEB over the low bandwidth, first communication path; and
in response to a primary outbound port losing a link, changes the primary outbound port for controller traffic to a second outbound port.

19. The controller of claim 16, wherein, in response to the IHS being placed in main power operating mode, the VCM configures the controller to:
enumerate each connected device in a PCI slot in the IHS;
detect a management interface of the device;
identify whether the connected device provides only thermal reporting over the first communication path; and
in response to determining that the connected device provides only thermal reporting over the first communication path, send NC-SI frames to the VEB as pass-through traffic by using an alternative Ethertype on the second communication path, wherein the NC-SI frames pass through the intermediate device and are routed by the VEB to either an external network address or to the device based on a destination address provided within the NC-SI frames.

20. The controller of claim 16, wherein the intermediate device is a small capacity NIC, the second-type connector is a reduced media-independent interface (RMII) based transport (RBT) cable, and, in response to identifying the VEB following auxiliary power on, the VCM configures the controller to:
identify a presence of the device with sideband enablement in the first PCI slot;
initiate operations to verify, with tunneled NC-SI commands, correct placement and configuration of the RBT cable;
configure, via the RBT cable, the intermediate device for NC-SI pass-through, the configuring including providing link parameters and a management MAC address of the controller;
confirm a slot position of the VEB; and
identify which adapter of multiple adapters attached to the IHS that the controller will use to connect to an external network.

* * * * *